No. 629,711. Patented July 25, 1899.
P. CAPON.
DRAFT EXCLUDER.
(Application filed Mar. 6, 1899.)
(No Model.)
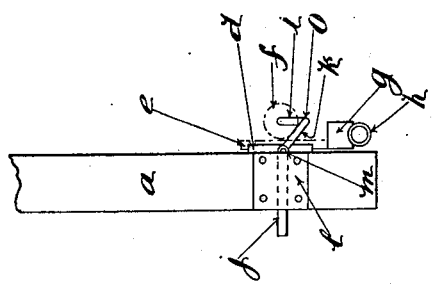
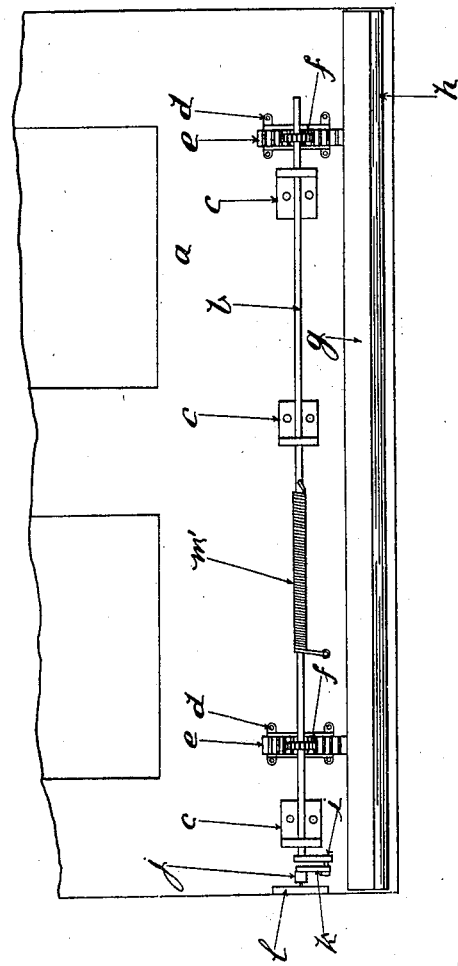
Witnesses.
Benjamin Clark
Charles H. Briggs
Inventor:
Philip Capon.
per:- E. Eaton.
His Attorney

UNITED STATES PATENT OFFICE.

PHILIP CAPON, OF LONDON, ENGLAND.

DRAFT-EXCLUDER.

SPECIFICATION forming part of Letters Patent No. 629,711, dated July 25, 1899.

Application filed March 6, 1899. Serial No. 708,026. (No model.)

*To all whom it may concern:*

Be it known that I, PHILIP CAPON, a subject of the Queen of Great Britain, and a resident of Peckham, London, in the county of Surrey, England, have invented certain new and useful Improvements in Draft-Excluders, (for which I have applied for a patent in Great Britain, No. 2,732, dated February 7, 1899,) of which the following is a full, clear, and exact specification.

This invention relates to improvements in draft-excluders for use upon doors or other suitable position, and although I have mentioned draft-excluders it will be readily seen that my invention is applicable for other purposes, such as the exclusion of dust or moisture.

For the purpose of illustration I will now refer to the annexed drawings, in which—

Figure 1 is a front elevation showing my invention attached to the bottom of the door; Fig. 2, an end elevation of same.

$g$ is a strip of suitable material, which carries a tube of india-rubber or other such suitable material $h$ and is supported upon the racks $e$, which slide in suitable guides attached to the door $a$ at $d$ by means of screws, or such like. $b$ is a rod supported in the bearings $c$, also attached to the door in any suitable manner and upon which the wheels $f$ are mounted and which engage upon the teeth upon the rack $e$. The end of the rod may be bent or provided with a crank $i$ to which the connecting-piece $k$ is pivotally attached at $o$, and also pivotally attached at $m$ to the sliding or push piece $j$, $l$ being a plate attached to the door when required for the purpose of guiding the movement of the sliding or push piece $j$. The parts are so arranged that when the door is closed the push-piece $j$ will be moved in the direction of the rod $i$, and thus cause the rubber tube $h$ to come into contact with the floor or surface, thus preventing a draft. The spring $m'$ is for the purpose of returning the rod to its initial position when the door is opened.

Having thus described my invention, and in what manner the same is to be performed, I declare that what I claim, and desire to secure by Letters Patent, is—

In draft-excluders of the class herein described a bar carrying a tube of rubber or such like suitable material and operated through the medium of racks to which said bar is attached; the rod or bar carrying toothed wheels supported upon suitable bearings, said toothed wheels, engaging in the rack aforesaid, a push-piece adapted to operate the crank upon said bar carrying the toothed wheels for the purpose of causing same to rotate when required, and so bringing the hollow tube of rubber or other substance into contact with the desired surface, a controlling-spring so arranged as to return the rod or bar to its initial position when the push-piece is not in contact with the operating-surface all in combination, and substantially as described and illustrated herein and for the purpose set forth.

In testimony that I claim the foregoing I have hereunto set my hand this 10th day of February, 1899.

PHILIP CAPON.

Witnesses:
  JAMES PLINNEY,
  WILLIAM JOHN WILKS.